Aug. 7, 1923.
J. W. POLLOCK
1,464,394
ANT TRAP
Filed March 3, 1922
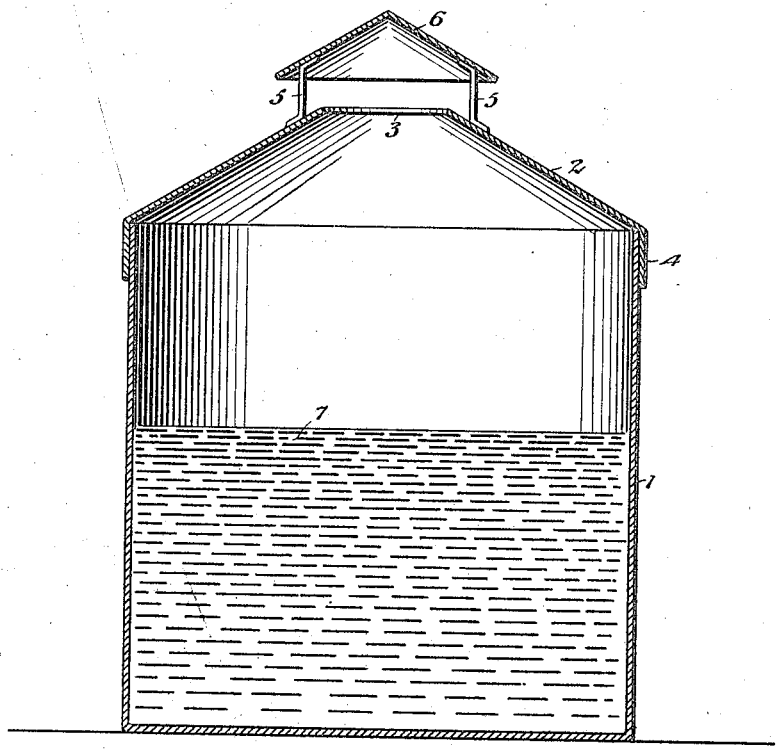
WITNESSES
Edw. Thorpe
F. J. Foster
INVENTOR
John W. Pollock
BY Munn & Co
ATTORNEYS Patented Aug. 7, 1923.

1,464,394

UNITED STATES PATENT OFFICE.

JOHN WILLIAM POLLOCK, OF SOLDIERS HOME, SAWTELLE, CALIFORNIA.

ANT TRAP.

Application filed March 3, 1922. Serial No. 540,754.

*To all whom it may concern:*

Be it known that I, JOHN W. POLLOCK, a citizen of the United States, and a resident of Soldiers Home, Sawtelle, in the county of Los Angeles and State of California, have invented a new and Improved Ant Trap, of which the following is a full, clear, and exact description.

This invention relates to improvements in insect traps, particularly to a trap designed for catching ants, an object of the invention being to provide a trap of this character from which an insect cannot escape, and designed in such a manner that ants or other insects are induced to enter.

A further object is to provide a trap of this character, which will be simple and practical in construction, efficient in use, easy to clean, and inexpensive to manufacture.

With these and other objects in view, the invention consists in certain novel features of construction and combinations and arrangements of parts as will be more fully hereinafter described and pointed out in the claims.

The accompanying drawing is a view in longitudinal section through my improved trap.

Referring in detail to the drawing, I have used the reference numeral 1 to designate a container provided with a cover 2. The container is preferably of cylindrical shape and the cover 2 is substantially conical, having an entrance opening 3 at its apex, through which the insects are adapted to enter, and being formed with a depending defining flange 4, which fits over and embraces the mouth of the container 1.

Brackets 5 secured upon the cover 2 adjacent the opening 3 serve to support a conical hood or deflector 6 above the opening 3 in the container cover. Ants and other insects are prone to crawl under projecting shelves or projections of this character so that the hood serves the double purpose of inducing the ants to enter the container and preventing rain water from accumulating in the container.

After the ants have entered it is necessary to provide some means to prevent their escape. With this end in view, the can is partially filled with a sticky sweet bait, designated by the reference numeral 7. In preparing this bait, I prefer to utilize a mixture which consists of ninety per cent molasses and ten per cent glue. The sweetness of the molasses will attract the ants and the glue will absolutely prevent their escape after they have become entangled in the same. The mixture is sufficiently heavy to prevent the ants from sinking therein after they are dead and in cleaning the trap, it is merely necessary to remove the cover and skim the dead ants off the top of the liquid in the container.

Although I have illustrated one of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a portable insect trap of the type including a bait chamber and detachable cover and hood elements, the combination of an open-topped cover having but a single chamber therein, said chamber being closed at its bottom and on all sides, and a mass of viscous liquid in the container, said mass being a combined bait and detent for ants reaching the same, the liquid being adhesive to detain ants reaching and touching the same and being of sufficient density to float the detained ants near the surface thereof but out of contact with the bottom of the container.

2. The insect trap defined in claim 1, wherein said container comprises a can of opaque material and entirely open at its top, and there are provided cover and hood elements including a frusto-conical cover of opaque material and open at its apex and adapted to rest by gravity on the upper edge of the can top and also including an upwardly dished hood of opaque material permanently carried by the cover and spaced above the opening in the cover while closely overlying the same.

JOHN WILLIAM POLLOCK.